Patented June 5, 1928.

1,672,848

UNITED STATES PATENT OFFICE.

FELIX LAUTER, OF PHILADELPHIA, PENNSYLVANIA, ASSIGNOR TO ROHM & HAAS COMPANY, A CORPORATION OF DELAWARE.

RESINOUS REACTION PRODUCT OF UREA AND FORMALDEHYDE.

No Drawing. Application filed January 12, 1926. Serial No. 80,812.

My present invention relates particularly to a resinous-appearing product made by reacting on urea (within which term I intend to include thiourea or substitution products) with a substance adapted to yield formaldehyde, in the presence of a substance which is adapted to serve as a stabilizer for the final product, or to form such stabilizer during the condensation.

It is my belief that as a so-called urea resin ages, a certain amount of formic acid is developed, and this drives out of the product some or all of the moisture (formed by condensation) which is originally present. When this moisture is driven out, internal strains occur and the product cracks. I have found that if a substance which will take up the formic acid is incorporated in the resinous material at the time of the original condensation, this tendency to crack will be eliminated. As an illustration of a type of material which will serve for this purpose, I may use an aromatic sulfonamide of which para-toluol-sulfonamide is an example. This substance, as well as the urea, will react with the formaldehyde and will form a substance of a resinous nature which does not by itself pass into an infusible state, but continues in a state where it is capable of taking up formic acid so that the composite product which results will be found to have a high degree of stability. The proportion of the stabilizing agent used may be varied over wide limits. For example, I have found that as little as one molecule of para-toluol-sulfonamide to 40 molecules of urea will give beneficial results for certain purposes. The para-toluol-sulfonamide reaction product in addition to acting as a stabilizing agent serves to soften the final product and make it more elastic and easier to machine; it also increases the resistance of the product to heat and raises the temperature at which the product is converted into the infusible form.

An ordinary reaction product of urea and formaldehyde can be molded at about 300° F. but will decompose somewhat if the temperature is raised substantially above 325° F. My new product (for example, a product made by combining 3 molecules of urea and one of para-toluol-sulfonamide with an appropriate amount of formaldehyde) can be molded at 300° F., but when so molded will still have the capability of being softened by heat so that an improperly molded article can be broken up and re-molded. On the other hand, if the temperature is raised substantially above this point, the product may be converted into the infusible state.

If desired, other materials such as fillers, esters, glycerine, casein or coloring agents may be added after the original condensation has taken place and the condensation may be carried on either with or without the addition of condensation agents.

For the purposes of illustration only I cite various examples of ways in which my invention may be used. It is to be understood that the various condensation products can be concentrated more or less to give the desired consistency for the uses to which they are to be put.

*Example 1.*—706 gr. alcoholic solution of formaldehyde (50% by weight, practically free of water) (about 11.7 mols) and 171 gr. (1 mol) of para-toluol-sulfonamide are brought to the boil in a container connected with a reflux condenser; then 180 gr. (3 mols) of urea in solid form or dissolved in alcohol are added and boiled until condensation takes place. The liquid condensation product can be mixed with a filler, such as wood flour, mica, asbestos, cellulose, etc., dried and then pressed under heat.

*Example 2.*—4500 gr. alcoholic solution of formaldehyde (50% by weight, practically free of water) (about 27 mols) and 513 gr. para-toluol-sulfonamide (1 mol) are treated as in Example 1, and 1800 gr. (10 mols) of urea are added. After about fifteen minutes, 90 gr. of oxalic acid are added and boiled until condensation is completed. This liquid condensation product can be used for impregnating canvas, paper, etc. which may then be dried and laminated under heat and pressure.

*Example 3.*—6040 gr. of alcoholic solution of formaldehyde (50% by weight, practically free of water, (about 67.11 mols) and 256.5 gr. (1 mol) of para-toluol-sulfonamide, are treated as in Examples Nos. 1 and 2, and 1800 gr. (20 mols) of urea are added, then 90 gr. of oxalic acid are added and boiling continued until the reaction is completed. This condensation product may be mixed with a solution of nitro-cellulose, cellulose acetate, etc., and will form an excellent lacquer or varnish.

*Example 4.*—1500 gr. of aqueous solution of formaldehyde (40% commercial solution) (about 40 mols) and 85 gr. para-toluol-sulfonamide (1 mol) are treated as in Examples Nos. 1 to 3; then 225 gr. (15 mols) of urea are added and boiled until the reaction is completed. This condensation product can be used to impregnate canvas, paper, etc., dried and laminated under heat and pressure; or the original product can be dried to solid form and pressed under heat, either as a large mass or after the same has been disintegrated to powder form.

What I claim is:

1. The process of producing resinous urea reaction products, which comprises the step of causing a condensation to take place between urea and formaldehyde in the presence of an aromatic sulfonamide.

2. A process as defined in claim 1, in which the aromatic sulfonamide is para-toluol-sulfonamide.

3. A process as defined in claim 1, in which the aromatic sulfonamide is para-toluol-sulfonamide, present in the proportion of less than one molecule of para-toluol-sulfonamide to each molecule of urea, and not less than one molecule of para-toluol-sulfonamide to forty molecules of urea.

4. The process of producing reaction products of urea and an aldehyde, which comprises the step of reacting on the urea with an aldehyde in the presence of an aromatic sulfonamide and a solvent, substantially no water being present.

5. A new product comprising a reaction product of urea and an aldehyde and an aromatic sulfonamide.

6. A new product comprising a reaction product of urea and an aldehyde and para-toluol-sulfonamide.

FELIX LAUTER.